Aug. 12, 1958 C. E. LOMAX 2,847,511

RAPID CHANGE-OVER IN AUTOMATIC SWITCHES

Filed June 17, 1955 6 Sheets-Sheet 1

INVENTOR.
CLARENCE E. LOMAX

BY [signature]

ATTY.

RAPID CHANGE-OVER IN AUTOMATIC SWITCHES

INVENTOR.
CLARENCE E. LOMAX
BY [signature]
ATTY.

LS

INVENTOR.
CLARENCE E. LOMAX
BY Wm. Walter Owen.
ATTY.

INVENTOR.
CLARENCE E. LOMAX
BY McWalter Owen
ATTY.

Aug. 12, 1958 C. E. LOMAX 2,847,511

RAPID CHANGE-OVER IN AUTOMATIC SWITCHES

Filed June 17, 1955 6 Sheets-Sheet 5

*INVENTOR.*
CLARENCE E. LOMAX
*BY* [signature]
ATTY.

Aug. 12, 1958 C. E. LOMAX 2,847,511

RAPID CHANGE-OVER IN AUTOMATIC SWITCHES

Filed June 17, 1955 6 Sheets-Sheet 6

INVENTOR.
CLARENCE E. LOMAX

BY Mc Walter Owen

ATTY.

United States Patent Office 2,847,511

Patented Aug. 12, 1958

2,847,511

RAPID CHANGE-OVER IN AUTOMATIC SWITCHES

Clarence E. Lomax, Chicago, Ill., assignor to General Telephone Laboratories, Incorporated, a corporation of Delaware Application June 17, 1955, Serial No. 516,063

12 Claims. (Cl. 179—18)

This invention relates to telephone systems and particularly to improvements in switching arrangements for effecting a change-over operation in the time interval between dialled digits.

In numerical automatic switches it is customary to provide a slow to release relay, called the "change-over" relay, for facilitating a change from one to another kind of operation, for instance, from primary to secondary motion of the switch between the pulses of one digit of a called number and the pulses of a succeeding digit. In the case of a Strowger switch, for example, the change-over relay is coupled with the magnet which steps the switch in the vertical direction. If a series coupling is utilized, the change-over relay takes a portion of the operating current thus decreasing the amount reaching the vertical magnet, and if a weak signal (short pulse) is received such as that from defective telephone lines, the magnet may have difficulty operating. If the change-over relay is connected in parallel with the vertical magnet, long pulses such as those received over high resistance telephone lines tend to hold the magnet operated too long and may cause erratic operation if the magnet fails to release before the next pulse is received. Variations in voltages on the telephone lines will aggravate the above conditions. The change-over relay must remain operated during the transmission of the train of pulses for a given digit, since upon its release, the impulsing circuit is shifted from the vertical to the rotary magnet. To assure this continued operation it is necessary to make this relay inherently slow to release, but doing so results in a delay after the train of pulses before this relay releases and performs its change-over function. This, in turn, imposes limitations on the speed with which successive trains of pulses may follow each other.

It is therefore an object of this invention to increase the speed of the change-over operation in automatic switches.

A feature of this invention is the transmission of a control signal to the switching mechanism immediately upon completion of a train of digital impulses.

Another feature of this invention is the use of a differential relay which operates upon receipt of a control signal at the end of a digit, that is, after completion of a first type of movement by the switching mechanism and conditions the switching mechanism for a second type of movement. Use of this relay permits elimination of the standard change-over relay described hereinbefore.

Another object of this invention is to provide greater flexibility in a switching device, permitting restricted service to certain stations utilizing the switching device while denying such service to other stations utilizing the same switching device, and to increase the efficiency and speed of operation of the switching device.

Two embodiments of the invention are shown. In the first embodiment, the differential relay is utilized for rapid change-over in an eleven level selector switch of the Strowger type and in modified form in ten level selectors and connectors of the Strowger type as used in a private automatic branch exchange. Provision is made for restricted service to permit access by only certain of the substations in the private automatic branch exchange to a manual switchboard in the central office or alternatively to a special switch train facilitating the establishment of connections to certain subscribers by dialling fewer digits.

In the second embodiment the differential relay is shown in an eleven level selector used as an incoming selector in a network including three public automatic exchanges, one of which has a manual switchboard which can be reached by the subscribers of all three exchanges.

A more complete understanding of the invention will be obtained from the detailed description which follows and by reference to the accompanying drawings in which:

Fig. 1 is a trunking layout illustrating the first embodiment and showing a private automatic exchange.

Fig. 1*a* shows diagrammatically a central office trunk circuit T1 accessible to substations such as S2 (Fig. 1) having a pushbutton PB, and also shows a manual switchboard M1 terminating the trunk in the central office.

Fig. 1*b*, which is alternative to Fig. 1*a*, shows a special group of connectors C2 arranged to give privileged substations such as S2 two digit access to a special group of substations in the private automatic exchange.

Some of the apparatus involved in the two embodiments will be described briefly hereinafter with reference to Figs. 1, 1*a*, 1*b* and 5.

Figures 1, 1A, 1B:
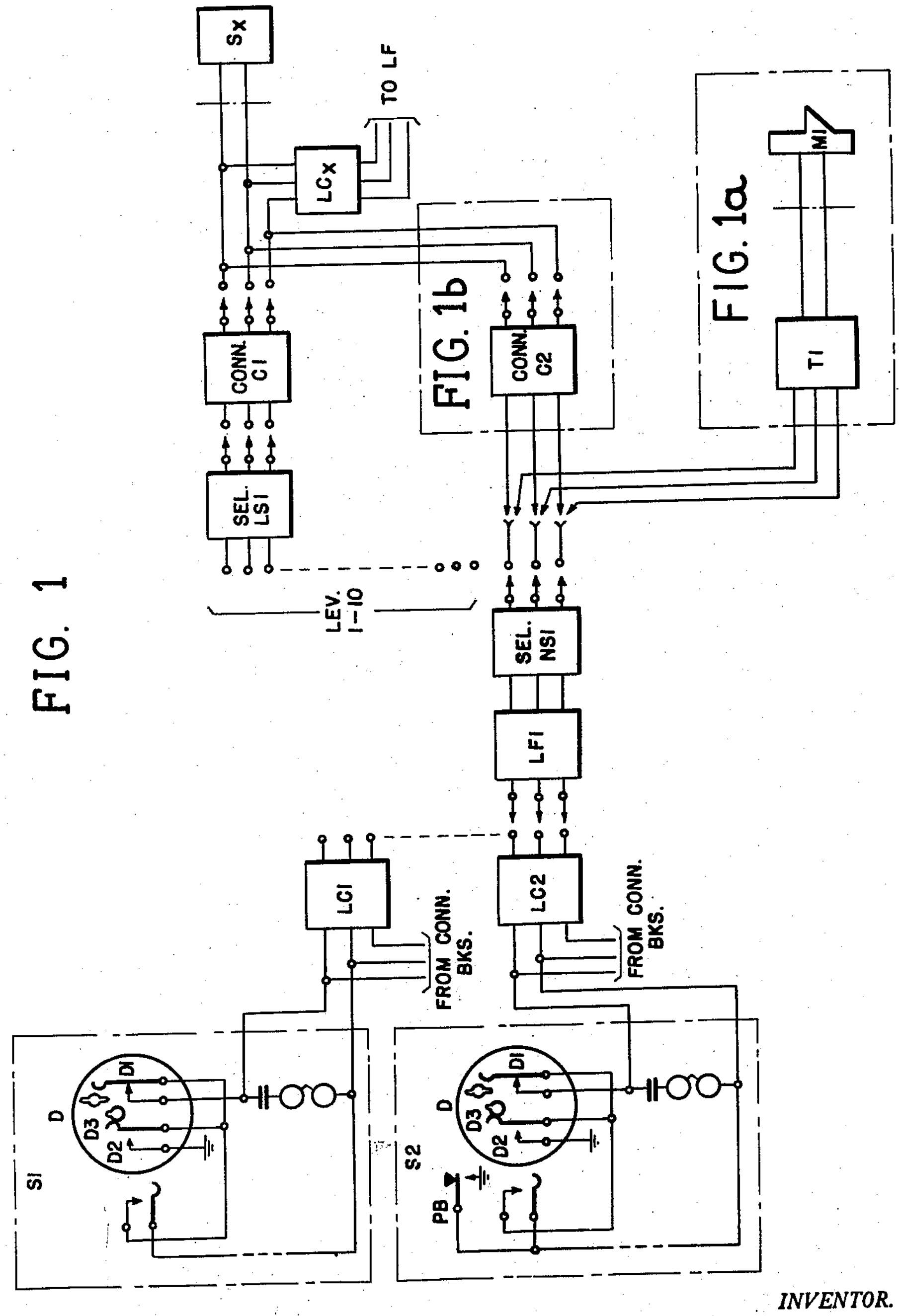

In the first embodimentn, there is shown connected to the private automatic exchange (Fig. 1) a restricted subscriber's station S1 without a pushbutton and a non-restricted or privileged subscriber's station S2 having a pushbutton PB. S1 has access only to other local stations such as S*x*, this access being through its line circuit LC1, a linefinder such as LF1, a normal level selector such as NS1, a local second selector such as LS1, a connector such as C1 and line circuit LC*x*. NS1 is identical in circuit design to selector NS, Fig. 2. When a subscriber at a privileged substation such as S2 depresses the pushbutton PB at this station without or before dialling a digit, selector NS1 is caused to select immediately an idle outlet in its normal level. If Fig. 1*a* is used, a privileged substation thus gains access, by way of trunk circuit T1, to the switchboard M1 in the central office. If Fig. 1*b* is used instead of Fig. 1*a*, a privileged substation such as S2 is connected in this manner to a special group of connectors, such as C2, through which certain local subscribers including S*x* may be reached on a two-digit basis.

Figure 5:
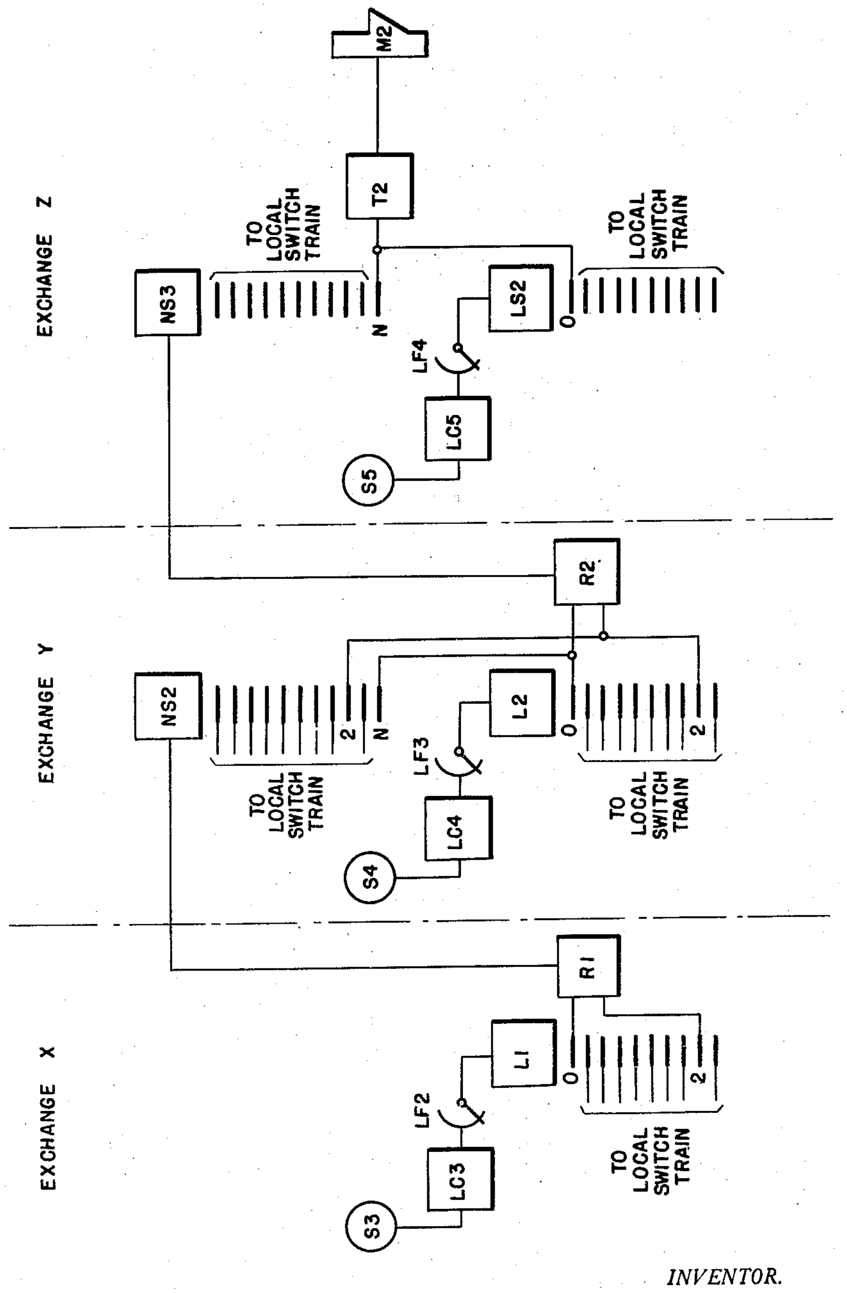
Fig. 5 is a trunking layout showing three central offices X, Y and Z which comprise a system illustrating the first embodiment.

In Fig. 5 stations such as S3, S4 and S5 in exchanges X, Y and Z respectively have access to other stations (not shown) in their respective exchanges through their respective line circuits LC3, LC4 and LC5, linefinders such as LF2, LF3 and LF4, local selectors such as L1, L2 and LS2 and the respective local switch trains (not shown). Interoffice trunks are provided between exchanges X and Y and between Y and Z. Dual access repeaters R1 and R2, identical in circuit design to repeater R, Fig. 6, have access to these trunks. Each of these repeaters may be seized over either of two points of access which determine the manner of further extension of a call. Thus, if repeater R1 or R2 is seized over the tenth level of the preceding local selector, the repeater will transmit, immediately after seizure, a ground pulse over the associated outgoing trunk. If repeater R1 or R2 is seized over the second level of the local selector no ground pulse is transmitted upon seizure.

Incoming selectors NS2 and NS3 are connected to the other ends of these two outgoing trunks. These selectors are identical in circuit design to selector NS, Fig. 2, and are arranged to extend a connection over the normal level N upon receipt of a ground pulse at time of seizure, or in the absence of such a ground pulse, to extend a connection over another level in accordance with digital impulses repeated by outgoing repeaters R1 and R2 respectively. The bank contacts in the normal and second levels of the incoming selectors in exchange Y, such as NS2, are multipled to the corresponding bank contacts in the tenth and second levels respectively of the local selectors such as L2. In exchange Z the normal level outlets of the incoming selectors, such as NS3, are multipled to the tenth level outlets of the local selectors, such as LS2, to provide access to operator's trunk circuit T2. This trunk circuit, in turn, is connected to a manual switchboard M2. For simplicity the switches required for interoffice or toll calls in one direction only are shown in Fig. 5.

Stations in the private automatic exchange (Fig. 1) and stations in exchange Z (Fig. 5) have dials arranged to place ground on the station line conductors momentarily after the last impulse of a series of digital impulses is transmitted by the dial. Dial D in station S1 (Fig. 1), for example, transmits digital impulses by operation of contacts D1 as the dial restores to normal after operation. After the last closing of contacts D1, that is, delivery of the last digital impulse in a series, cam D3 causes contacts D2 to close and ground the line. Further movement of the dial toward its normal position moves cam D3 off the movable spring of contacts D2 thereby opening the contacts D2. The dial then restores to its normal position. The standard dial shunt springs are not shown in dial D for greater simplicity. In connection with these dials, reference is made, for example, to United States Patent 2,366,647, issued February 2, 1945, to J. E. Ostline.

Stations in exchanges X and Y (Fig. 5) may be of any known type equipped to transmit dial impulses but not ground pulses.

The line finders shown in Figs. 1 and 5, as well as selectors L1 and L2, Fig. 5, may be of any known type, e. g. the Strowger type. In connection with these switches and also the line circuits in Figs. 1 and 5, reference is made, for example, to my United States Patent 2,214,908, issued September 17, 1940.

Referring now more particularly to Figs. 1, 1*a*, 1*b*, 2, 3 and 4 the various operations of the apparatus involved in the first embodiment will be described in detail. It will first be assumed that a subscriber at substation S1 desires to call another substation, for instance S*x* in the private automatic exchange. Upon removal of the handset, the line circuit LC1 will cause linefinder LF1 to seize the calling line connecting it through to selector NS1 in the well known manner. Relay 230 of selector NS1 (Fig. 2) operates from battery, through the upper windings of relays 230 and 220, contacts 211, conductor 12, through the line loop of the substation, conductor 13, contacts 213, the lower windings of relays 220 and 230, and through cam springs C10 to dial tone and ground. Relay 220 has its upper and lower windings differentially wound so that these two windings are energized in opposition to each other over the loop path just traced and prevent operation of relay 220 at this time. Dial tone is returned to the calling substation through cam springs C10, and the lower half of the line loop just traced. Operation of relay 230 causes contacts 231 to close, operating relay 240 from battery, through relay 240 and contacts 231 and 217 to ground. Relay 240 at contacts 242 connects ground to control lead 14 thereby holding the preceding equipment. Contacts 244 are also closed preparing an operating path for the vertical magnet 260.

Hearing dial tone the party at station S1 actuates the dial D in accordance with the first digit of the called subscriber's number. As the dial D returns to its normal position, impulse contacts D1 in the dial D open a number of times corresponding to the digit dialled, thereby breaking the operating circuit of relay 230 a corresponding number of times. At each release of relay 230 contacts 232 close completing the operating path for the vertical magnet 260 from battery, through the winding of 260, contacts 223, 244, 232 and 217 to ground thereby causing the selector NS1 to take a number of vertical steps corresponding to the digit dialled. Relay 240 is made slow to release to assure its holding during the dial pulses. Vertical off-normal springs 261 were closed on the first vertical step, operating relay 250 which in turn closed a point in the path to release magnet 280 at contacts 252.

After the last digital impulse of the series is transmitted by the dial D, but before the dial has returned to its normal position, cam D3 causes contacts D2 to close momentarily, thereby connecting ground momentarily to both conductors of the subscriber's line, by way of impulse springs D1 and the hook switch contacts respectively. This ground shunts the lower winding of relays 220 and 230. Relay 220 operates over this path sufficiently to close its preliminary or "X" contacts 221 while relay 230 is held through its upper winding. Relay 240 previously closed its contacts 243 so that a locking circuit is completed for relay 220 which extends from battery through the center winding of relay 220, and contacts 221 and 243 to ground. Energization of its middle winding permits relay 220 to operate fully closing contacts 222 and 224 and opening contacts 223. Relay 220 locks fully operated through the center winding. A point in the operating path of the vertical magnet 260 is opened at contacts 223, thereby preventing further vertical motion of the switch. Rotary motion is initiated at contacts 222, viz. in a circuit extending from battery through rotary magnet 270, interrupter contacts 272, cam springs C12, contacts 218, 202 and 222 to ground. Automatic trunk-hunting action of the wipers 15, 16 and 17 thus takes place across the level to which the selector was previously raised.

The bank contacts on levels 1 to 10 of selector NS1 provide access to a local switch train including selector LS1 and connector C1 over which local P. A. X stations such as S*x* may be reached. Idle selector LS1 (Fig. 3) is seized when control wiper 17 of selector NS1 encounters battery on the bank contact associated with control lead 20, which battery is supplied through contacts 351 of LS1. Test relay 200 (Fig. 2) is operated from this battery through contacts 224 to ground. Operation of relay 200 opens the circuit of rotary stepping magnet 270 at contacts 202 thereby preventing further rotary motion, and closes contacts 201 to operate switching relay 210 from battery through relay 210, contacts 201 and 222 to ground. Relay 210 locks through contacts 216 and closes contacts 212 and 214 switching the line conductors through to selector LS1 and breaking the circuit for relay 230 at contacts 211 and 213. Relay 230 releases, closing a point in the operating circuit of release magnet 280 at contacts 232. Relay 240 in turn releases closing another point in the release magnet operating circuit at contacts 245 and also removing ground from the middle winding of relay 220 at contacts 243 causing relay 220 and hence 200 to release.

The battery encountered by control wiper 17 upon seizure of idle selector LS1 is replaced by ground upon switch through of the line conductors and operation of relays 330 and 340 (Fig. 3), thereby closing contacts 341. This ground maintains a locking circuit, among others for relay 210, subsequent to the release of relay 240, viz. through control conductor 20, wiper 17 and contacts 215 and 216. Relay 200 releases due to its winding being short-circuited incident to the operation of relay 210 and closes contacts 202. Relay 210 opened contacts 218 prior to release of relay 200 to assure that the path to the rotary magnet 270 remains open after closure of contacts 202. Contacts 217 were also opened to prevent release magnet 280 from operating prior to the release of relay 210.

The above-described change-over action under control of differential relay 220 assures the preparation of the succeeding switch to receive the digital impulses of the next digit with a minimum of delay.

Before proceeding with the description of the extension of the call through second selector LS1, a brief explanation of the operation of selector NS1 shall first be given in the event that all second selectors encountered in rotary stepping of selector NS1 are busy. In this case relay 200 and hence 210 will be unable to operate and rotary magnet 270 will step the switch mechanism to the eleventh bank position indicative of an all trunks busy condition. Cam springs C10, C11 and C12 are actuated in this position. C11 will close placing busy tone on the calling line. Cam springs C10 and C12 will open removing dial tone from the calling line and preventing further rotary motion respectively.

Figure 3:
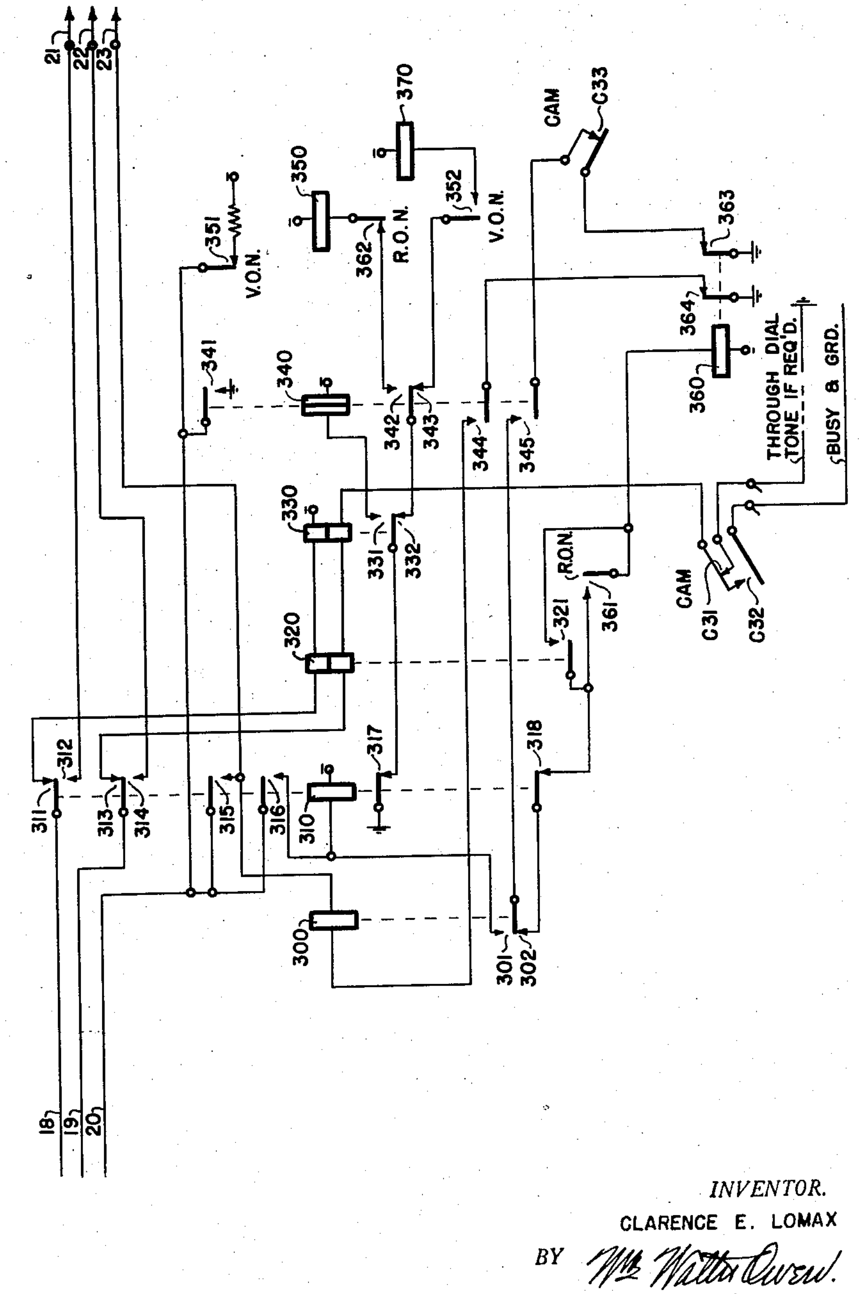
Fig. 3 shows a local selector LS. It is similar in operation to selector NS but has only ten levels.
Figure 4:
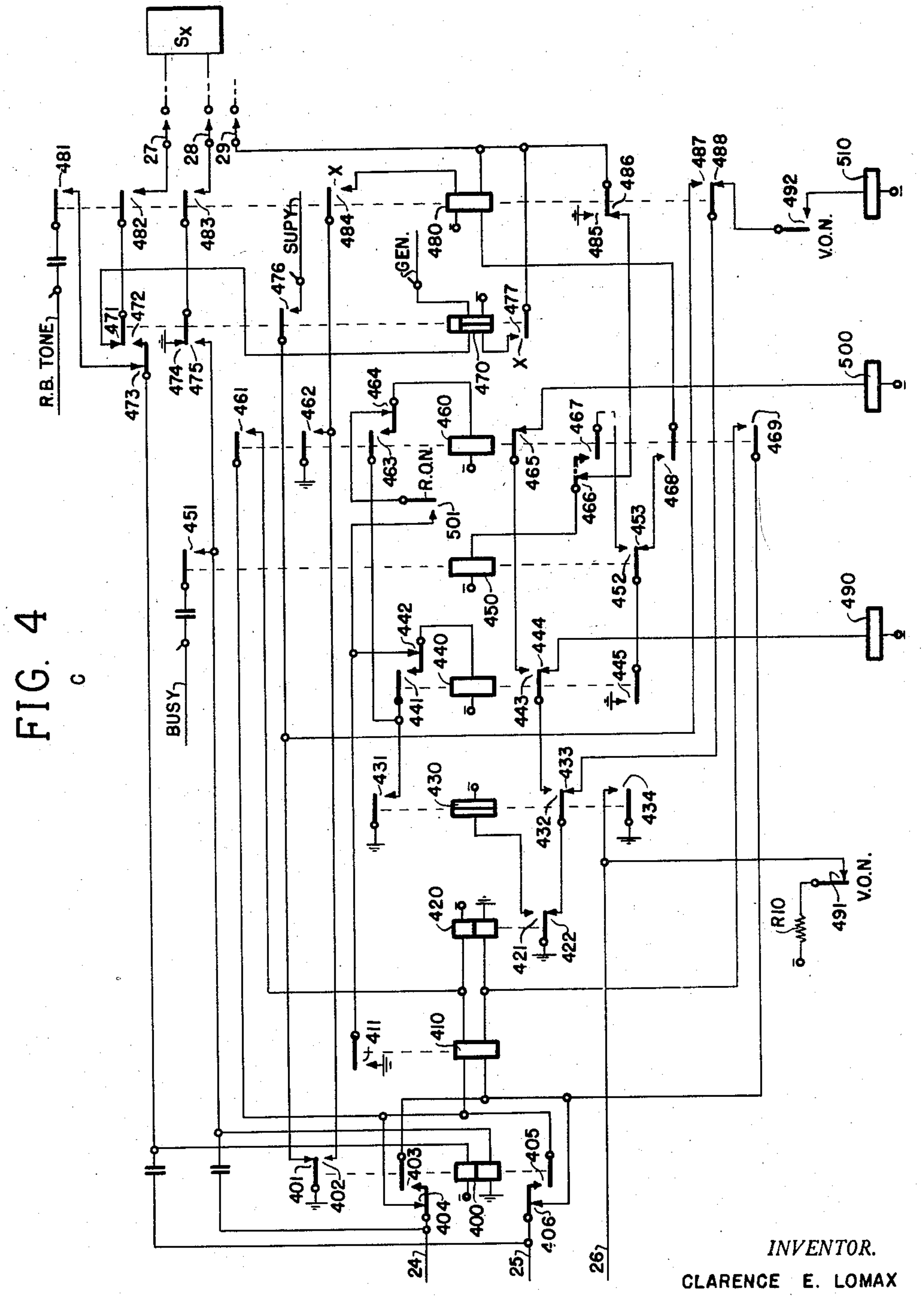
Fig. 4 shows a local connector C which is standard except for the differential relay change-over operation.

Reverting now to the seizure of idle selector LS1, the operating circuit for line relay 330, Fig. 3, may be traced from battery, through the upper windings of relays 330 and 320, contacts 311, conductor 18, the line loop, conductor 19, contacts 313, the lower windings of relays 320 and 330, and cam springs C31 to ground. Relay 320 is differentially wound and will not operate over the operating path traced for relay 330. The operating path for relay 340 extends from battery through the winding of this relay and contacts 331, 317 to ground.

A second digit is dialled at substation S1, each impulse causing relay 330 to release and complete a circuit to the vertical magnet 350 at contacts 332 thereby causing vertical stepping to the selected level. Due to its slow-release characteristics relay 340 is held throughout the train of impulses. Vertical off-normal springs 351 open on the first vertical step removing battery from control lead 20 and keep the switch busy during release until the switch mechanism has returned to normal. Vertical off-normal springs 352 close at the same time preparing an operating path for the release magnet 370.

At the end of this train of digit impulses, the dial again delivers a ground pulse which causes differential relay 320 to operate. Unlike the differential relay in selector NS1, relay 320 does not have a third (locking) winding. Thus it only operates momentarily; i. e., for the duration of the ground pulse from the dial. Upon operating, relay 320 closes contacts 321 establishing a path to the rotary magnet 360, from battery, through magnet 360, contacts 321, 318, 302, 345, C33, and 363 to ground. Upon the first rotary step, rotary off-normal springs 361 close, maintaining the circuit for rotary stepping when relay 320 releases opening contacts 321. In this manner the switch is started on an automatic trunk hunting operation across the selected level.

When battery from an idle connector such as C1 (Fig. 1) is encountered by control wiper 23 (Fig. 3), relay 300 operates from this battery, through the relay winding, contacts 344 and 364 to ground. This causes contacts 301 to close and contacts 302 to open, thereby breaking the rotary magnet circuit at 302 and operating relay 310 from battery through relay 310, contacts 301, 345, C33 and 363 to ground. Relay 310 switches the line loop through to connector C1 (Fig. 1) at contacts 312 and 314, locks to ground on control conductor 20 through contacts 316, at contacts 317 opens a point in the circuit of release magnet 370, and opens contacts 318 to prevent additional rotary motion when relay 300 restores. The line loop to relay 330 is broken by opening of contacts 311 and 313 releasing relay 330 followed by release of relay 340. Relay 300 releases due to its winding being short-circuited upon the operation of relay 310.

In the event that all connectors encountered in rotary stepping of selector LS1 are busy, relay 300 and hence relay 310 will be unable to operate, and rotary magnet 360 will step the switch mechanism to the eleventh bank position indicative of an all trunks busy condition. Cam springs C31 will open and C32 will close placing busy tone on the calling line. Cam springs C33 will open to prevent further rotary motion.

Connector C1 (Fig. 4) employs a differential relay 410 to achieve a change-over operation both at the end of the first and the second digit received by this switch, viz. in response to a ground pulse received from the calling end after these two trains of digit impulses respectively, as more particularly described hereafter. Relay 410 is in series with the pulsing relay 420 during pulsing but is shunted out upon completion of the talking connection.

When the control wiper 23 of selector LS1 encounters the bank contact associated with control lead 26 of idle connector C1, battery through resistance R10 and vertical off-normal springs 491 causes the selector LS1 to switch through as previously described, thereby extending the line loop to relay 420. Relay 420 operates, but series relay 410, being differentially wound, remains inoperative. Operation of relay 420 closes contacts 421 operating relay 430 which closes contacts 434 placing ground on lead 26 thereby marking the switch as busy and holding the preceding switches operated. The third digit of the called subscriber's number is dialed at station S1 causing relay 420 to operate intermittently and thereby causing the following vertical stepping circuit to be closed each time relay 420 releasing closes contacts 422: battery, winding of vertical magnet 490, contacts 444, 432 (held operated during pulsing by slow to release relay 430), and 422 to ground. A ground pulse from the dial at the end of this third train of digit impulses operates differential relay 410 momentarily which closes contacts 411 causing relay 440 to operate from battery, through relay 440, contacts 442 and 411 to ground. Relay 440 in closing contacts 441, locks to ground at contacts 431, the initial ground being removed thereafter by opening of contacts 442. A circuit is prepared to the rotary magnet 500 by closure of contacts 443, and a point in the path to vertical magnets 490 is opened at contacts 444.

Thus, in response to the fourth digit dialled the rotary magnet 500 is intermittently actuated over the following circuit: battery, magnet 500, contacts 465, 443, 432, 422, ground. In this manner the wipers 27, 28 and 29 of connector C1 are positioned on the set of bank contacts corresponding to called subscriber S*x*. A ground pulse from the dial, after this train of pulses, again operates relay 410, momentarily. This time contacts 411 in closing operate relay 460 in a path extending from battery through the winding of relay 460, contacts 464, rotary off-normal springs 501 (which were closed on the first rotary step), and contacts 411 to ground. Relay 460 operates and locks to ground at contacts 431 through contacts 463, the original ground being removed by opening of contacts 464. Contacts 461 and 469 close, shunting relay 410. Contacts 465 open the path to the rotary magnet to guard against further dialling. Contacts 468 close, placing ground at operated contacts 445 on control wiper 29 through contacts 453, 468, and lower winding of relay 480.

Should the called station S*x* be busy when the control wiper 29 engages the control bank terminal of the called station control lead, ground will be present on this control lead, which ground will operate busy relay 450 prior to the operation of relay 460, viz. through contacts 466 and 486 connecting busy tone to the calling line at contacts 451. When relay 460 operates to open contacts 466 and close contacts 467, a holding circuit for relay 450 is established through contacts 467, 452 and 445 to ground. Relay 450 opens contacts 453 to prevent the connector from "cutting in" on a busy line should it be freed while the connector is connected therewith and is in the busy position; that is, when ground on control wiper 29 is replaced by battery.

If the called line is idle, battery from the called station's associated line circuit LCx will be encountered by wiper 29 in the well known manner. An operating path through the lower winding of relay 480 is thus established, in series with the cut-off relay, not shown, in line circuit LCx. Relay 480 closes its "X" contacts 484 which thereby fully operate and lock relay 480 through its upper winding to ground at contacts 462. Relay 480 closes contacts 482 and 483 so that ringing current is projected over the called line from ringing generator, through the upper winding of relay 470, contacts 471, 482, wiper 27, the station ringer, wiper 28, and contacts 483 and 474 to ground. Ringback tone is returned to the calling telephone through contacts 481 and 473.

When the called subscriber answers by removing the handset, the loop circuit is closed at substation Sx, thereby allowing ring cut-off relay 470 to operate "X" contacts 477. This completes a locking circuit from battery through the lower winding of relay 470 to ground at contacts 485, and allows relay 470 to operate fully. Contacts 471 and 473 open disconnecting ringing current from the called line and ringback tone from the calling line respectively. Contacts 472 and 475 close, extending the calling line through to the called line. Battery reversing relay 400 is now connected to the called telephone line and operates to reverse battery feed from relay 420 to the calling end for purposes not further illustrated, namely by closing contacts 403 and 405 and opening contacts 404 and 406. Contacts 402 close providing a multiple ground in the locking circuit of relay 480. Release supervision is provided in the well known manner over supervisory lead designated SUPY in Fig. 4, viz. over contacts 487 and 476 for the calling party and over contacts 401 and 476 for the called party.

Ground for release of the connector C1 at termination of the conversation is provided through contacts 422 of relay 420, which relay is released when the calling party disconnects. Relays 430, 440 and 460 release in turn shortly thereafter. Release of relay 430 removes ground from the control lead 26 at contacts 434, thereby allowing the preceding switches to restore as described hereafter with respect to selectors LS1 and NS1. When the called party disconnects relay 400 releases, opening the locking circuit for relay 480 at contacts 402. Relay 460 had previously removed a multiple ground for relay 480 at contacts 462. Relay 480 releases, permitting relay 470 to restore and completing an operating path for the release magnet 510 from battery, through magnet 510, contacts 492, 488, 433 and 422 to ground. When the switch mechanism has returned to normal the above circuit of release magnet 510 is opened at contacts 492 and at contacts 491 battery is reconnected to control conductor 26, thereby rendering the switch available to other calls.

When ground is removed from lead 26 as mentioned above, relay 310 of selector LS1 (Fig. 3) releases closing an operating path for release magnet 370 extending through off-normal springs 352, and contacts 343, 332 and 317, this path being opened at contacts 352 upon the release of the switch. Relay 210 of selector NS1 (Fig. 2) is also released by removal of ground from the connector control lead 26 and a similar release operation occurs in selector NS1. When relay 250 releases incident to the opening of off-normal contacts 261 selector circuit NS1 is fully restored to normal condition.

As mentioned above, trunks such as T1 (Fig. 1*a*) are accessible from the P. A. X (Fig. 1) through the normal level of selector NS1, thereby providing access to the central office switchboard M1. Only privileged substations such as S2 having a pushbutton PB can reach the switchboard M1 as will be shown hereinafter. Assuming that the subscriber at S2 wishes to make a call through the manual switchboard M1 he removes his handset from the cradle. Idle linefinder LF1 seizes the calling line through line circuit LC2 and connects it to selector NS1. Relay 230 (Fig. 2) operates over the line loop and dial tone is returned to the calling party as previously described. Relay 220, being differentially wound will not operate over the line loop. Hearing dial tone the calling party depresses pushbutton PB at station S2 momentarily, thereby grounding line conductor 12 momentarily and causing relay 220 to operate through its upper winding. Relay 220 locks through contacts 221 and closes contacts 222 to complete the operating circuit of rotary magnet 270 and initiate rotary motion as previously described. In this instance, however, rotary motion was not preceded by vertical stepping so that selection of an outlet is made on the eleventh (normal) level of the selector NS1, which accommodates trunks such as T1 (Fig. 1*a*). On the first rotary step off-normal contacts 271 close to operate relay 250. In all other respects the operation of the selector as to trunk-hunting, switch-through, release and overflow signalling is the same as that explained above in connection with a call to substation Sx, except that in the instant case relay 250 is controlled by contact 271 alone rather than both contacts 261 and 271. Thus station S2 gains access to a trunk to the central office switchboard M1 without dialling. Non-privileged stations such as S1 must dial on all calls and cannot gain access to the normal level outlets of selector NS1. For while ground pulses are transmitted automatically from all substations, including restricted stations such as S1 to operate differential relay 220 at the end of the first digit, viz. for change-over purposes, only the stations having the pushbutton can cause this relay to operate upon seizure of the switch.

By connecting the normal level outlets of selector NS1 (Fig. 1) to a special group of connectors such as C2 (Fig. 1*b*) instead of to the manual switchboard M1 (Fig. 1*a*), a P. A. X is provided which allows privileged stations to reach certain stations by the dialling of only two digits. Such stations, having a pushbutton PB for transmitting a ground pulse prior to dialling, may gain access to the special connector group through the normal level of selector NS1 in the same manner as described above for calls to the manual board M1. Connector C2 is identical in design and operation to C1 and has access to a selected group of stations in the P. A. X, substation Sx being one of them as shown in Fig. 1. The advantage of this system lies in permitting a busy executive for example, to reach stations he would desire to contact most frequently by merely pressing the ground button to gain access to connector C2 and then dialling two digits, into this connector rather than dialling the four digits required of the other stations in the P. A. X as described hereinbefore.

The second embodiment of this invention involves the use of switch mechanisms containing the differentially wound change-over relay in a network of public exchanges. Referring to Fig. 5 it is assumed that exchange Z having the switchboard M2 therein has all exchange station dials modified to provide a ground pulse immediately after each set of digit impulses as shown for the P. A. X stations in the first embodiment. Exchanges X and Y have dials which are not arranged to deliver ground pulses. However, since incoming selector NS3 in Z and also incoming selector NS2 in Y require such a ground pulse for their change-over operation, repeaters R2 and R1 are arranged to provide this pulse.

A local call in exchange Z will be traced first. Upon removal of the handset at station S5, line circuit LC5 will cause idle linefinder LF4 to search for and seize the calling line connecting it through to selector LS2 in the well known manner. Selector LS2 has outlets on its first nine levels to the local switch train. The operation of the selector LS2 is the same as described for selector LS1 in the first embodiment, a dial ground pulse after the last digital impulse causing a differential relay to operate and control a change-over from vertical to automatic rotary stepping in search of an idle outlet to the local switch train. Succeeding digits will operate the succeeding switches in like manner to that described for LS1 and C1 in the first embodiment and extend the call through to the called local station (not shown).

Should the party at S5 desire to place a call requiring the assistance of an operator at the manual switchboard M2, he would dial the digit "0" as the first digit. This will cause selector LS2 to select an outlet in its tenth level, which level is connected through trunk circuits such as T2 to the switchboard M2.

In exchange X, the party at station S3 may call other stations, not shown, in his own exchange, the call going through LC3, LF2, L1 and the conventional local switch train over levels of L1 other than the second and tenth levels, the switchboard M2 in exchange Z is also accessible from station S3 by dialing of the digit "0." The selector L1 will be raised to its tenth level thereby, and will automatically select an outlet in that level to an idle repeater circuit such as R1. Upon connection from this point of access, R1 will transmit a ground pulse over the trunk interconnecting exchanges X and Y to incoming selector NS2. Upon receipt of this ground pulse, NS2 will automatically select an outlet in its normal level, which level in turn is connected to one point of access to outgoing repeaters such as R2 in exchange Y. R2 upon seizure from this point of access will transmit a ground pulse over a trunk between exchanges Y and Z to incoming selector NS3. This ground pulse causes NS3 to select an outlet in its normal level, which level is connected to trunks such as T2 leading to the switchboard M2. Thus the dialling of the single digit "0" will connect a station in exchange X to the switchboard in exchange Z.

The party at S3 may call local stations in exchange Y by dialling special access digit 2. Selector L1 will be raised to its second level and will automatically select an outlet to a repeater such as R1 from the other point of access to the repeaters. Seizure from this point of access will have no immediate effect other than to prepare R1 to repeat digit impulses into selector NS2 in exchange Y over the interoffice trunk. The first digit of the called station number proper is dialled at S3. R1 repeats the digit impulses into NS2 causing it to be raised to a level having outlets to the local switch train of exchange Y. R1 will transmit a ground pulse to NS2 after the last digit impulse has been repeated. This ground pulse will cause NS2 to begin rotary motion on the selected level, seeking an idle outlet in that level. Subsequent digits will be repeated into the local switch train to complete the connection to the called station (not shown).

Should the party at S3 desire to call a local station in exchange Z, the procedure outlined above is followed but in this case the prefix digit 2 is dialled twice. The second of these prefix digits will cause selector NS2 to select an outlet in its second level, which level is connected to repeaters such as R2. Seizure of R2 from this point of access merely prepares R2 to repeat the impulses of the next dialled digit into selector NS3 which impulses will raise NS3 to a level for selection of a succeeding local switch in exchange Z. A ground pulse is transmitted from R2 to NS3 after the last digit impulse is repeated, thereby starting automatic selection of an outlet in the level to which NS3 has been raised. Succeeding digits will complete the connection to the station (not shown in exchange Z through the local switch train.

Stations in exchange Y such as S4 have access to local stations, stations in exchange Z, and the switchboard in exchange Z in similar fashion to that described above for station S3. A detailed circuit description of calls from S4 will now be given and will suffice to describe the same types of calls from stations in the other exchanges. Reference will be made to Fig. 5 and to the repeater and selector circuits, Figs. 6 and 2 respectively.

Let it first be assumed that a party at station S4 in exchange Y, Fig. 5, desires to make a call to the manual switchboard in exchange Z. He dials the digit "0" after seizure of his line by linefinder LF3, thereby raising local selector L2 to its tenth level where it will search for an idle repeater (see Fig. 6). Selector L2 which is of the battery-searching type will encounter battery on control lead 6, Fig. 6, of repeater R2 denoting an idle condition and will switch the subscriber line through to line conductors 4 and 5 of repeater R2. Relays 610 and 620 of the repeater operate over the line loop thus formed, from battery through the upper winding of relay 620, over line conductor 4, through the subscriber's telephone, over line conductor 5, through relay 610, and through the lower winding of relay 620 to ground. Relay 620 closes contacts 622 operating relay 630 which in turn closes contacts 635 to operate relay 650. Relay 630 at contacts 634, 633 also transfers control leads 6 and 3 from battery to ground thus busying the repeater against other calls and holding the preceding switches. Relay 650 closes its contacts 652 and 654 connecting the repeater to outgoing trunk conductors 12 and 13. It may be mentioned at this point that contacts 651, 653, 658 and the conductors indicating the connections from these contacts to an incoming selector may be ignored for the purposes of the instant embodiment as the inter-office trunks, Fig. 5, were assumed to be of the one-way type. Relay 610 closes its contacts 611 placing ground on outgoing trunk conductor 12 through contacts 652, and closes its contacts 612 to operate slow operating relay 600 from battery, through relay 600, contacts 657, closed by operation of relay 650, and contacts 612 to ground. Relay 600 closes contacts 601 shunting contacts 621 of relay 620. Relay 600 also closes contacts 602 shunting relay 610 thereby causing relay 610 to release and remove the ground from conductor 12. Relay 600 locks to ground through contacts 604, 656 and 635. Thus a momentary ground pulse is transmitted to selector NS3 over conductor 12.

Figure 2:
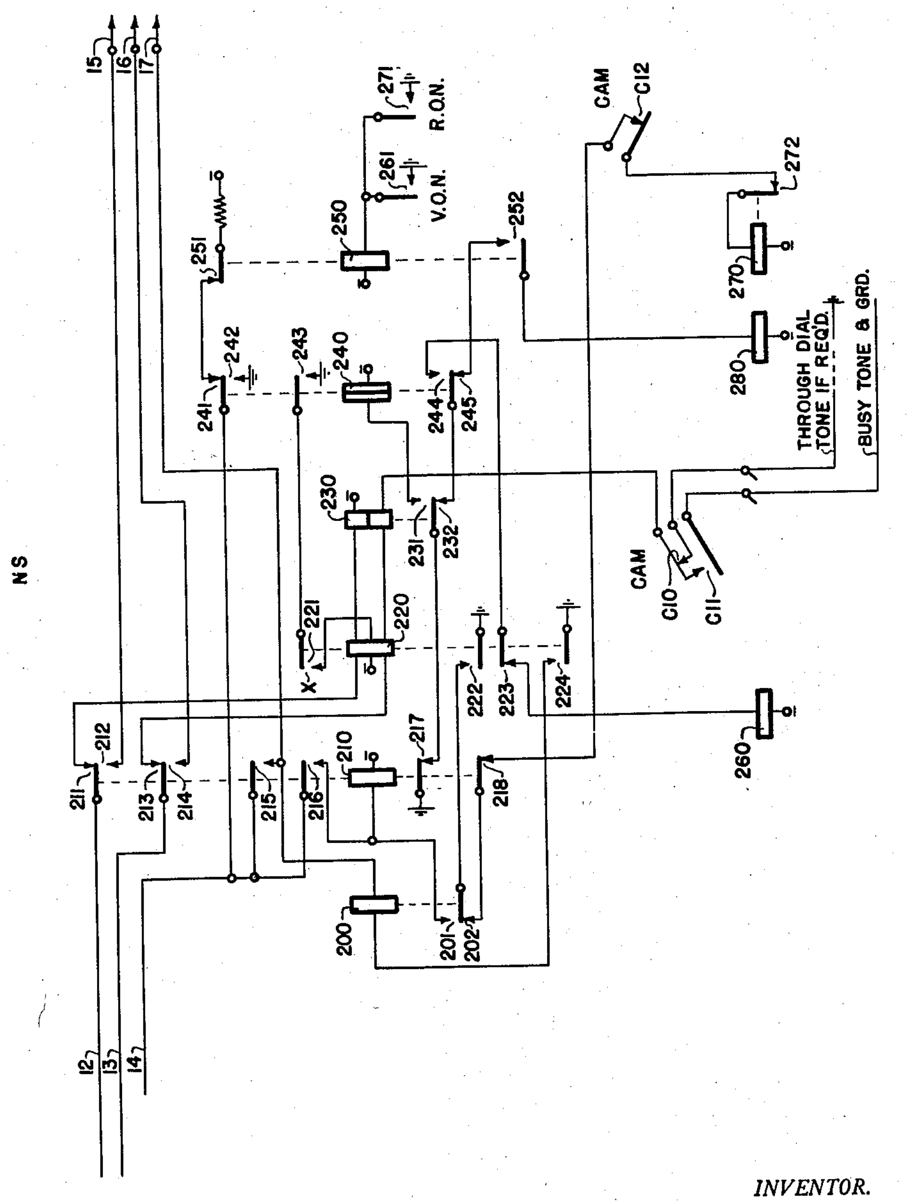
Fig. 2 shows an eleven (normal) level selector NS which is arranged to extend a connection through any one of a group of outlets in a normal level if seized in a certain manner.

Referring now to Fig. 2, relay 230 operates upon transmission of the ground pulse from the repeater R2, the path being from battery, through the upper windings of relays 230 and 220, contacts 211, trunk conductor 12 (Fig. 6), and contacts 652 and 611 of repeater R2 to ground. Relay 220 whose upper and lower windings are differentially wound also operates over this path sufficiently to close its preliminary or "X" contacts 221. Relay 230 closes its contacts 231 to operate relay 240, which in turn closes its contacts 243 thereby supplying ground to the middle winding of relay 220 through contacts 221. Energization of this middle or locking winding permits relay 220 to operate fully. After its initial operation from the repeater ground pulse, relay 230 is held operated over a loop path which may be traced from battery, through the upper windings of relays 230 and 220, contacts 211, trunk conductor 12 to repeater R2 (Fig. 1), contacts 652, 631, 601 or 621, resistance R10, contact 654, trunk conductor 13, contacts 213, lower winding of relays 220 and 230, and cam springs C10 to ground.

Relay 220, upon operating fully as described above, closes contacts 222 and 224 while opening contacts 223. A point in the operating path of the vertical magnet 260 is opened at contacts 223, thereby preventing vertical motion of the switch. Rotary motion is initiated due to the closure of a stepping circuit extending from battery through rotary magnet 270, interrupter contacts 272, cam springs C12, contacts 218, 202 and 222 to ground. Since selector NS3 was in its vertical normal position upon initiation of rotary motion, automatic rotation of the wipers thus takes place across the normal (eleventh) level provided in this switch. On the first rotary step off-normal contacts 271 close to operate relay 250. Bank contacts on the normal level of selector NS3 are connected through suitable trunk circuits such as T2 (Fig. 5) to operator's positions at the manual switchboard M2. Battery encountered by control wiper 17 (Fig. 2) will indicate an idle trunk circuit. Thus when the wipers of selector NS3 have been advanced to a rotary position corresponding to an idle trunk circuit, this battery will operate test relay 200 over control wiper 17, winding of relay 200, and operated contacts 224 to ground. Operation of relay 200 opens the circuit of rotary stepping magnet 270 at contacts 202, thereby preventing further rotary motion, and closes contacts 201 to operate switching relay 210 from battery through relay 210, contacts 201 and 222 to ground. Relay 210 locks by way of contacts 216, and later also 215, and at contacts 212 and 214 completes a talking path to trunk circuit T2 and thence to the operator. Thus a talking connection is completed from a subscriber in exchange Y to the manual switchboard in exchange Z merely by dialling a single digit. At contacts 211, 213 relay 230 and hence relays 240, 220 and 200 are permitted to restore.

Release of selector NS3 is the same as described hereinbefore in connection with release of selector NS1 in the first embodiment. In the instant case when the calling party restores the handset of station S4, the loop circuit for relay 620 of the repeater R2 is broken. Relay 620 restores, followed shortly thereafter by relays 630, 650, 600, and 660. At contacts 633 of relay 630 ground is removed from conductors 3 and 6 which permits the preceding switches to release. Battery is restored to control conductors 3 and 6 on closure of contacts 603, 644 and 634 preparing the circuit for subsequent calls. At 621, 631 selector NS1 is permitted to restore.

Let it now be assumed that the subscriber S4 in exchange Y desires to contact a local station in exchange Z. He will proceed by first dialling the access digit 2 in the instant example followed by the directory number proper of the called station. Dialling of the access digit 2 into the local selector L2 will cause L2 to hunt over its second level for an idle repeater such as R2. Referring again to Fig. 6, the repeater has its line conductors 1 and 2 and control conductor 3 connected to the bank contacts in the second level of selectors such as L2. If idle, R2 will have battery on control lead 3 through contacts 634, 644 and 603. Selector L2 will stop when it encounters this battery and extend the loop over conductors 1 and 2 to relay 620 of repeater R2. In this instance, relay 610 will not be in series with relay 620 and will not operate, hence no ground pulse is transmitted over the trunk at the time of seizure of repeater R2. Relay 620 closes contacts 622 operating relay 630. Relay 630 at contacts 634, 633 transfers conductors 3 and 6 from battery to ground to busy the repeater and closes contacts 635 placing operating ground on relay 650. Relay 650 closes contacts 652 and 654 completing the line loop to the succeeding incoming selector NS3 over conductor 12, operated contacts 652, 631, 621, resistance R10, contacts 654 and conductor 13. Relay 650 also closes contacts 655 to operate relay 660 which at contacts 661, closes a point in a ground connection to line conductor 13.

Figure 6:
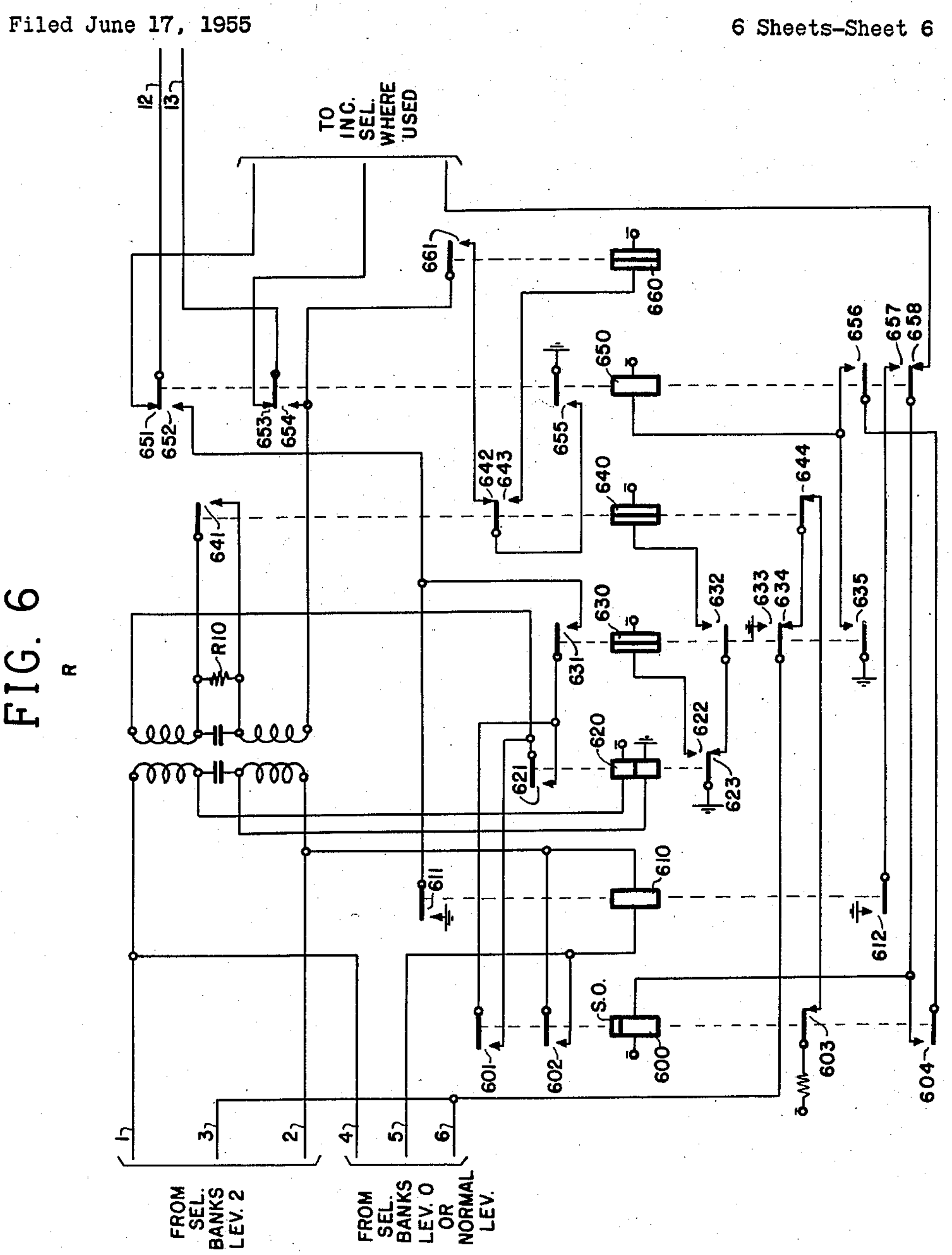
Fig. 6 shows a repeater circuit R arranged for seizure over two distinct paths and disposed to repeat digital impulses and transmit ground pulses over an outgoing trunk.

Relay 230, Fig. 2, in incoming selector NS3 at exchange Z operates over the trunk loop in a loop circuit previously traced in detail. Since a ground pulse is not transmitted on seizure of the incoming selector in this instance differential relay 220 does not operate at this time. Relay 230 closes contacts 231 operating relay 240 from battery, through relay 240, contacts 231 and 217 to ground. Relay 240 closes contacts 244, among others, preparing a circuit to the vertical magnet 260. Subscriber S4 in exchange Y now dials the first digit of the local directory number of the called station, thereby producing a series of interruptions in the line loop circuit to repeater relay 620 (Fig. 6). Responsive to these interruptions in its circuit, relay 620 deenergizes momentarily a corresponding number of times and at each deenergization opens its make contacts 621. Similarly each opening of contacts 621 causes an interruption in the loop circuit to relay 230 (Fig. 2) which in turn deenergizes momentarily a corresponding number of times and at each deenergization closes its contacts 232 completing the circuit to the vertical magnet 260 from battery, through the magnet 260 contacts 223, 244, 232 and 217 to ground. Relay 240 is slow to release thus maintaining contacts 244 operated during the interruptions of its circuit at contacts 231 of relay 230. On release of relay 620 (Fig. 6) caused by the first digit impulse, contacts 623 are closed, but relay 630 being slow to release, remains operated thus providing an operating path for relay 640 from battery through relay 640, contacts 632 and contacts 623 to ground. Relay 640 operates closing contacts 643 thereby completing a path for operation of relay 660 from battery, through relay 660, contacts 643 and contacts 655 to ground. Relay 660 closes its contacts 661.

Vertical stepping of switch NS3 now occurs, whereby the wipers of this switch are raised to the desired level. At the end of the train of digit impulses, relay 620 reoperates removing ground from the operating circuit of relay 640 and allowing relay 640 to release. In restoring, relay 640 at contacts 642 connects ground to the trunk, whereby differential relay 220 is energized in the following circuit: ground through contacts 655, 642, 661, resistor R10, contacts 621, 631, 652, conductor 12, contacts 211 (Fig. 2), upper winding of relays 220 and 230 to battery. Relay 220 operates sufficiently to close at contacts 221 a locking circuit from battery through the center winding of relay 220, contacts 221 and 243 to ground. The ground is removed when slow to release relay 660 (Fig. 6) restores and opens its contacts 661. The duration of the ground pulse is sufficient to allow relay 220 to operate and lock as described.

Relay 220 opens contacts 223, breaking a point in the operating path to the vertical magnet 260, another point having previously been broken at contacts 217 incident to the last reoperation of relay 210. Contacts 222 close, completing a path from ground to the rotary magnet 270 through contacts 222, 202, 218, C12 and 272 causing rotary stepping across the level to which the switch had been raised by the train of digit pulses. An idle succeeding switch in the local switch train in exchange Z is found and seized when battery from the succeeding switch operates relay 200 over control wiper 17 through relay 200 and operated contacts 224 to ground. Relay 200 opens contacts 202 breaking the circuit to the rotary magnet 220 and closes contacts 201 causing operation of relay 210 from battery, through relay 210, contacts 201 and 222 to ground. Relay 210 locks at contacts 216 and 215 and closes its contacts 212 and 214 switching the line through to the succeeding switch. The opening of contacts 211, 213 permits relay 230 and hence relays 240, 220 and 200 to restore.

Dialling the balance of the digits of the called number will cause the switches in the local switch train to extend the call to the called station, not shown, in exchange Z in the manner described for selector LS1 and connector C1 of the first embodiment with the exception that the ground pulses required for each change-over operation will be transmitted by the action of relays 660 and 640 in repeater R2 rather than by the station dial.

Use of the repeater for providing ground pulses to initiate the change-over operation permits subscribers in an exchange such as X or Y having stations which are not equipped to transmit such ground pulses to call into a distant exchange such as Z having switching equipment arranged to handle calls from stations which are equipped to transmit these ground pulses.

While the features of this invention have been disclosed with reference to specific embodiments only, it is understood, of course, that various modifications may be made without departing from the scope of this invention, and it is intended in the appended claims to cover all such modifications as fall within the true spirit and scope of this invention. In this connection it should be noted that the term "level" as used in the claims should not be interpreted as limiting the invention to switches in which the primary motion of the wipers is a vertical motion, the invention obviously being applicable to switches of other types as well.

What is claimed is:

1. In a telephone system, a telephone station having a calling device, an automatic switch having a plurality of wipers, a line having a pair of conductors interconnecting said calling device to said switch, a direct current source in said switch comprising a ground potential and a battery potential, a line relay in said switch having a pair of windings with one end of each winding connected to a different one of said potentials of said source and the other end of each winding connected to a different one of said conductors, said line relay operated responsive to a set of impulses transmitted over said conductors from said calling device, means operated by said line relay for controlling movement of said switch wipers, a differentially wound relay having its windings connected to said line conductors in serial relation with the windings of said line relay and remaining unoperated by said set of impulses due to the opposing action of its windings, a ground potential at said station, means included in said calling device for momentarily applying the ground potential at said station to both said conductors immediately after transmission of said set of impulses to short-circuit one winding of said differential relay and thus momentarily unbalance said opposing action of said windings, said differential relay thereafter operating responsive to said unbalanced action, and means operated by said differential relay for controlling a change in the manner of movement of said switch wipers.

2. In a telephone system, a telephone station having a calling device of the type, which upon returning to normal after actuation transmits numerical impulses, an automatic switch having a plurality of wipers, a line having a pair of conductors interconnecting said calling device at said station to said switch, a line relay connected to said conductors in said switch and operated responsive to a set of said numerical impulses transmitted over said conductors by means of said calling device to control movement of said switch wipers, a differentially wound relay connected to said line conductors in said switch in serial relation with said line relay and remaining unoperated by said numerical impulses due to the opposing action of its wipers, said calling device including means for momentarily completing an additional circuit over said conductors, after transmission of said set of impulses but before said device has returned to its normal position, to short-circuit one winding of said differential relay, said differential relay operated in response to the completion of said short-circuit for controlling a change in the manner of movement of said switch wipers.

3. In a telephone system, a line having a pair of conductors, a numerical switch for extending a connection incoming over said line, said switch having a plurality of wipers, first and second driving means for moving said switch wipers in a primary and secondary direction respectively, impulsing means connected to said line operable for transmitting digital impulses over said conductors to said switch, a line relay connected in said line in said switch operated responsive to said digital impulses to control said first driving means, a ground potential, means for momentarily applying said ground potential to both said line conductors following a series of said digital impulses to momentarily short-circuit one of said conductors and thereby render said one conductor ineffective in said line, a differential relay connected to said line in serial relation with said line relay operated in response to said short-circuit, and means controlled by said differential relay to effect a change-over from said first to said second driving means.

4. In a telephone system, a line having a pair of conductors, a numerical stepping switch for extending a connection incoming over said line, said switch having a plurality of wipers, first and second driving means for stepping said switch wipers in a primary and secondary direction respectively, impulsing means connected to said line operable for transmitting digital impulses over said line conductors to said switch, a line relay connected in said line in said switch operated responsive to said digital impulses to control said first driving means, whereby said wipers are directively stepped in said first direction, a ground potential, means for momentarily applying said ground potential to both said line conductors following a series of said digital impulses to momentarily short-circuit one of said conductors and thereby render said one conductor ineffective in said line, a differential relay connected to said line conductors in serial relation with said line relay and momentarily operated in response to said short-circuit, means controlled by said differential relay for closing a first circuit to operate said second driving means and automatically step said wipers in said second direction, and contact means actuated incident to the first step of said wipers in said second direction for closing another circuit to said driving means, whereby said automatic stepping operation is maintained after the said momentary operation of said differential relay.

5. In a telephone system, a line having a pair of line conductors, pulsing means at one end of said line for transmitting a series of digital impulses over said conductors, a ground potential at said one end, means in said pulsing means for momentarily connecting said ground potential to said conductors after the last impulse of said series has been transmitted to momentarily short-circuit one of said conductors and thereby render said one conductor ineffective in said line, a switch at the other end of said line having outlets in a plurality of traffic directions, a driving magnet included in said switch, a line relay and a differential relay connected to said line conductors in serial relation to each other, said line relay operated responsive to the receipt of only said digital impulse series, means operated by said line relay for controlling said driving magnet in selecting one of said traffic directions, said differential relay being operated thereafter in response to said momentary short-circuit, and means controlled by said differential relay for removing said driving magnet from the control of said line relay.

6. In a telephone system, a switch having outlets in a plurality of traffic directions of a first and second kind, a line incoming to said switch having two line conductors, means for completing a connection to said switch over said line conductors, impulsing means connected to said line operable for selectively transmitting digital impulses over said conductors to said switch, a line relay connected to said line conductors in said switch operated responsive to a series of said digital impulses to control selection of one of said plurality of traffic directions of said first kind, a differential relay connected to said line conductors in serial relation with said line relay, a first ground potential, means included in said impulsing means for momentarily connecting said first ground potential to both said line conductors after the last impulse in said series has been transmitted to momentarily short-circuit one of said conductors and thereby render said one conductor ineffective in said line, said differential relay momentarily operated in response to said short-circuit, means operated by said differential relay to control the operation of said switch in extending said line through an outlet in said selected traffic direction of said first kind, a second ground potential, other means for momentarily connecting said second ground potential to both said line conductors in the event that said impulsing means has not been operated, to momentarily short-circuit one of said conductors and thereby render said one conductor ineffective in said line, said differential relay momentarily operated responsive to the last-mentioned short-circuit, and means operated by said differential relay to condition said switch for extension of said line through an outlet in a traffic direction of said second kind.

7. In a telephone system, a numerical switch of the two-motion type and having outlets in a normal level and a plurality of off-normal levels, a trunk incoming to said switch having a pair of line conductors, means for extending a connection to said switch over said trunk line conductors, means for transmitting digital impulses over said line conductors, a first ground potential, a first short-circuiting means for momentarily connecting said first ground potential to both said line conductors subsequent to seizure of said switch by said extending means, prior to transmission of a series of digital impulses to said switch, for momentarily short-circuiting one of said line conductors to render said one conductor ineffective, a second ground potential, a second short-circuiting means for momentarily connecting said second ground potential to both said line conductors, subsequent to the transmission of a series of said digital impulses to said switch, for momentarily short-circuiting said one line conductor to render it ineffective, said switch including a line relay and a differential relay connected to said line conductors in serial relation to each other, said differential relay operated in case of said first-mentioned short-circuiting operation, means thereafter operated by said differential relay to condition said switch for further extending the connection to an outlet in said normal level, said line relay operated responsive to the receipt of a digital impulse series in case of the absence of said first short-circuiting operation, means operated by said line relay to control said switch in the selection of one of said off-normal levels, said differential relay operated in case of said second-mentioned short-circuiting operation, and means operated by said differential relay during said last-mentioned operation for controlling said switch in the further extension of the connection to an outlet in the said selected off-normal level.

8. In a telephone system, a telephone line including a pair of conductors, a trunk, switching means for extending a connection over said line to said trunk, a repeater circuit interposed in the connection between said switching means and said trunk and having a plurality of access paths over which said repeater circuit may be seized selectively by said switching means, impulse sending means connected to said line for transmitting a series of digital impulses over said line to said repeater circuit, a first means in said repeater circuit for repeating said digital impulses over said trunk in case said repeater is seized over one of said paths, a first ground potential in said repeater circuit, a second means in said repeater circuit automatically operative under control of said first means to momentarily connect said first ground potential to both said line conductors after said digital series has been repeated, whereby said line in said trunk is unbalanced, a second ground potential in said repeater circuit, a third means in said repeater circuit operative upon seizure of said repeater, only in case said repeater circuit is seized over a different one of said paths, for momentarily connecting said second ground potential to both said line conductors, whereby the line in said trunk is unbalanced.

9. In a telephone system such as claimed in claim 8, including a numerical two-motion switch connected at the distant end of said trunk, said switch having a normal level, a plurality of off-normal levels and a number of outlets in said normal and off-normal levels, a first and a second relay in said switch, said first relay operative in response to the said unbalancings of said trunk by said third means to cause selection by said switch of an outlet in said normal level, said second relay responsive to said series of digital impulses as repeated by said second means to control said switch in selecting one of said off-normal levels, said first relay operative in response to the unbalancing of said trunk by said first means to cause selection by said switch of an outlet in the selected off-normal level.

10. In a telephone system such as claimed in claim 8, including a control relay in said repeater circuit, means for operating said control relay under control of said third means, first shunting means operated by said control relay for shunting said third means to render said third means inoperative thereafter, and second shunting means operated by said control relay for shunting the said repeating operations of said first means to render subsequent repeating operations ineffective.

11. In a telephone system, a telephone line including a pair of conductors, a calling station at one end of said line, a first ground potential at said station, a key at said station manually operable for momentarily connecting said first ground potential to both said line conductors to short-circuit one of said conductors, a calling device at said station arranged to be operably connected to said line, means in said calling device for transmitting a series of digital impulses over said line, a second ground potential at said station, means in said calling device for momentarily connecting said second ground potential to both said line conductors immediately subsequent to said transmission of said series of impulses to automatically short-circuit one of said conductors, a selector switch of the two-motion type, means for extending said line conductors to seize said switch, a normal level and a plurality of off-normal levels in said switch with each level having a plurality of outlets, a line relay in said switch connected to said line, a differential relay in said switch connected to said line in serial relation with said line relay, said differential relay operated responsive to said short-circuiting of said one line conductor by said key in case said key is operated subsequent to said seizure, means thereafter operated by said differential relay for controlling the operation of said switch to select an outlet in said normal level, only said line relay being operated responsive to said series of digital impulses in case said calling device is operated subsequent to said seizure, means operated by said line relay for controlling the operation of said switch to select one of said plurality of off-normal levels, said differential relay momentarily operated thereafter in response to said short-circuiting of said one line conductor by said means in said calling device, and means operated by said differential relay for controlling the operation of said switch to select an outlet in the selected off-normal level.

12. In a telephone system, a telephone station, an automatic switch having a plurality of wipers, a line comprising a pair of conductors interconnecting said station and said switch, a direct current source in said switch comprising a ground potential and a battery potential, a line relay in said switch having a pair of windings with one end of each winding connected to a different one of the potentials of said source and the other end of each winding connected to a different conductor of said line, a differentially wound relay in said switch having its winding connected to said line in serial relation with the windings of said line relay, a direct current signalling loop circuit comprising said line conductors, said windings of said relays and said different potentials of direct current, means at said station when calling, for completing said loop circuit to operate only said line relay, a calling device at said station thereafter operated for interrupting said loop circuit a number of times corresponding to a dialled digit, said line relay being restored and reoperated responsive to said loop circuit interruptions, means operated by the said restorations and reoperations of said line relay for repeating pulses to control movement of said switch wipers, a ground potential at said station, means included in said calling device for momentarily applying said ground potential to both said line conductors immediately after termination of said last loop circuit interruption to unbalance the current flow through said differential relay windings and operate said differential relay, and means operated by said differential relay for controlling a change in the manner of controlling the movement of said switch wipers.

References Cited in the file of this patent

UNITED STATES PATENTS

| | | |
|---|---|---|
| 2,494,475 | Hersey | Jan. 10, 1950 |
| 2,567,650 | Morris | Sept. 11, 1951 |
| 2,593,419 | Den Hertog | Apr. 22, 1952 |